USO05600979A

United States Patent [19]

Winner et al.

[11] Patent Number: 5,600,979
[45] Date of Patent: Feb. 11, 1997

[54] VEHICLE ANTI-THEFT SYSTEM

[75] Inventors: James E. Winner, Hollywood Beach, Fla.; John Rutkowski, Cuyahoga Falls, Ohio

[73] Assignee: Winner International Royalty Corporation, Sharon, Pa.

[21] Appl. No.: 534,836

[22] Filed: Sep. 27, 1995

Related U.S. Application Data

[63] Continuation of Ser. No. 210,471, Mar. 21, 1994, abandoned.

[51] Int. Cl.$^6$ .................................................. B60R 25/02
[52] U.S. Cl. .......................... 70/252; 70/209; 70/237; 70/368; 70/DIG. 49; 180/287; 340/430; 307/10.3
[58] Field of Search .......................... 307/10.2, 10.3, 307/10.6; 70/209, 252, 237, 368, 239, DIG. 49; 340/527, 528, 523, 425.5, 430; 180/287

[56] References Cited

U.S. PATENT DOCUMENTS

| | | | |
|---|---|---|---|
| 3,740,713 | 6/1973 | Teich | 340/430 |
| 3,781,804 | 12/1973 | Lederer, Jr. | 340/430 |
| 4,125,833 | 11/1978 | Ravey | 340/523 |
| 4,320,382 | 3/1982 | Roucek | 340/430 |
| 4,398,405 | 8/1983 | Patriquin | 70/369 |
| 4,418,330 | 11/1983 | Kamichik | 340/430 |
| 4,553,127 | 11/1985 | Issa | 340/64 |
| 4,636,651 | 1/1987 | Kilgore | 340/430 |
| 4,738,127 | 4/1988 | Johnson | 70/209 |
| 4,935,047 | 6/1990 | Wu | 70/209 |
| 4,958,084 | 9/1990 | Carlo et al. | 307/10.2 |
| 4,961,331 | 10/1990 | Winner | 70/209 |
| 4,991,683 | 2/1991 | Garretto et al. | 180/287 |
| 5,128,649 | 7/1992 | Elmer | 340/430 |
| 5,172,094 | 12/1992 | Stadler | 340/528 |
| 5,235,832 | 8/1993 | Lux et al. | 70/368 |
| 5,315,286 | 5/1994 | Nolan | 340/430 |
| 5,355,703 | 10/1994 | Elinski et al. | 70/368 |

FOREIGN PATENT DOCUMENTS 3241705  10/1983  Germany ........................ 180/287

*Primary Examiner*—Darnell M. Boucher
*Attorney, Agent, or Firm*—Vickers, Daniels & Young

[57] ABSTRACT

A vehicle anti-theft system is provided comprising a mechanical security device mounted in a vehicle to limit rotation of the vehicle steering wheel and an electrically operable security device having armed and disarmed modes in which the starting motor circuit for the vehicle is respectively opened and closed independent of the vehicle ignition switch. The mechanical device includes a key operated locking mechanism for mounting and dismounting the device, the electrically operable device includes a key operated switch mechanism for arming and disarming the device, and the key operated locking mechanism and key operated switch mechanism are operable by the same common key. The electrically operable security device includes circuitry for maintaining the starting motor circuit of the vehicle open in response to an effort to bypass the key operated switch mechanism.

32 Claims, 3 Drawing Sheets

ります5,600,979

VEHICLE ANTI-THEFT SYSTEM

This is a continuation of application Ser. No. 210,471, filed Mar. 21, 1994 now abandoned.

BACKGROUND OF THE INVENTION

The present invention relates to the art of vehicle anti-theft systems and, more particularly, to a system comprised of separate mechanical and electrical security devices having a feature of co-dependency with respect to the use thereof and electrical security devices capable of remaining in an armed mode in response to tampering.

Vehicle anti-theft devices which are mechanically operable to restrain rotation of the vehicle steering wheel are of course well know and such mechanical devices are shown, for example, in U.S. Pat. Nos. 4,738,127 to Johnson and 4,961,331 to Winner, the disclosures of which are incorporated by reference herein for background information. These devices include a pair of attachment components in the form of hooks, each on a different one of a pair of telescopically interengaged members of the device, whereby the hooks are adapted to be relatively displaced between extended and retracted positions relative to one another and which positions correspond, respectively, to mounted and dismounted positions for the device. In use of the Johnson device, the hooks engage diametrically opposed portions of the steering wheel rim of a vehicle and the device includes an arm extending radially outwardly of the rim to preclude rotation of the steering wheel by engagement of the arm with the interior of the vehicle or the operator thereof. In use of the Winner device, one hook engages the steering wheel rim and the other engages a foot pedal lever on the floor of the vehicle, whereby both rotation of the steering wheel and depression of the foot pedal are restrained so as to preclude unauthorized operation of the vehicle. In each device, a key operated lock mechanism is provided for locking the hooks against relative displacement when in the mounted position of the device and for unlocking the hooks for relative displacement to enable dismounting of the device from its use position.

While mechanically operable vehicle anti-theft devices such as those shown in the Johnson and Winner patents are extremely effective anti-theft devices, vehicle operators often desire to optimize protection of their vehicles against theft by using such a mechanical device in conjunction with an electrically operated security device either installed in the vehicle at the time of manufacturer and integrated with the electrical system of the vehicle, or installed in the vehicle subsequent to manufacture thereof. Arming and disarming of such devices is generally achieved through the use a key operated switch arrangement located outside or inside the vehicle, or through an encoded signal from a remote transmitter as shown in U.S. Pat. No. 4,958,084 to Carlo et al, the disclosure of which is also incorporated herein by reference. Such devices may, for example, provide the desired anti-theft deterrent when armed by issuing a visible or audible alarm in response to an attempt to enter the vehicle or, as disclosed in Carlo et al, by inhibiting operation of a portion or portions of the electrical system in the vehicle such as the ignition system so as to preclude starting of the vehicle other than by an authorized user.

While it is desirable to combine mechanical and electrical anti-theft devices of the foregoing character to provide a vehicle owner with better protection against theft, use of the two devices requires two keys, or a key and a transmitter, one unique to each device. Thus, one or the other of the devices may not be used by a vehicle owner because of the inconvenience of having to carry two extra keys, or an extra key and a transmitter, in conjunction with use of the vehicle and the inconvenience of having to locate one of the keys or the transmitter to arm or disarm the electrical security device and having to locate the key for mounting or dismounting the mechanical device. If both devices are not used, or should a vehicle owner opt not to use a second device, the advantage of an added deterrent to theft of the vehicle can not be obtained. Further, in connection with electrical anti-theft devices, thieves are quite adapt at cutting wires or otherwise disabling such devices, whereby the deterrent effect thereof is substantially reduced or totally lost.

SUMMARY OF THE INVENTION

In accordance with one aspect of the present invention, a vehicle anti-theft security system is provided comprising mechanical and electrical security devices having a feature of interdependency providing for the system to be practical in use and more convenient to the vehicle owner in conjunction with such use. More particularly in this respect, an anti-theft system in accordance with the present invention comprises a mechanical device for limiting rotation of a vehicle steering wheel and which includes a key operated locking mechanism for locking and unlocking the relatively displaceable attachment components thereof when the device is mounted in its use position, and an electrically operated security device which is adapted to be armed and disarmed through the use of a key operated switching arrangement. In accordance with the invention, the key operated locking mechanism of the mechanical device and the key operated switch arrangement of the electrical device are both operable by the same key. Thus, the vehicle operator can quickly install the mechanical device and arm the electrical device through the use of a single key, saving the time and inconvenience of searching for a second key, and thus promoting simultaneous use of the two anti-theft devices. Likewise, the vehicle owner can disarm the electrical device and dismount the mechanical device with the same convenience and saving of time.

In accordance with another aspect of the invention, the electrical security device includes an anti-defeat feature operable to preclude certain efforts on the part of a thief to disarm or deactivate the security device. In this resect, the security device, when armed, is activated to provide a security function which is deactivated when the security device is disarmed by an authorized person. If a thief attempts to deactivate the security device when it is armed, such as by cutting and rejoining wires in the key operated switch assembly, an anti-defeat circuit is actuated by which the security function is maintained, thus to further deter theft of the vehicle. Preferably, the security device functions, when armed, to open or otherwise inhibit the staring motor circuit of the vehicle and functions in response to certain theft efforts to maintain the starting motor circuit inhibited while, in the absence of such efforts, enabling the security device to be quickly and easily deactivated by an authorized user of the vehicle.

In any event, a system according to the present invention retains the advantages of two different security systems and the further advantage of diversity therebetween by one being mechanical and the other electrical while, at the same time, eliminating the inconvenience heretofore encountered in connection with having to provide a key unique to each device, the cost of structurally unique key operated mechanisms for the two devices and the additional time required to independently operate each device between its use and non-use modes. Furthermore, while providing the electrical security device with an anti-defeat feature, security is further promoted by greatly increasing the difficulty and time required on the part of a thief in an effort to eliminate the security devices and thus steal the vehicle. Such difficulty and time requirement are more than likely sufficient to cause a would-be thief to abandon the theft effort.

It is accordingly an outstanding object of the present invention to provide an improved vehicle anti-theft system comprising independent mechanical and electrical security devices each of which is independently controlled with respect to its use and non-use modes.

Another object is the provision of an anti-theft system of the foregoing character wherein the time and effort required on the part of an authorized user to enable or disable the devices with respect to their providing their corresponding security function is substantially decreased.

A further object is the provision of an anti-theft system of the forgoing character wherein each of the mechanical and electrical security devices are controlled by a corresponding key operated mechanism and which security devices are interdependent in that the two key operated mechanisms are operable through the use of a common key.

Yet another object is the provision of a vehicle anti-theft system wherein an electrical security device includes an anti-defeat feature whereby the security function provided by the device continues to be operable in response to certain theft efforts.

Still another object is the provision of an anti-theft system of the foregoing character which maintains the desirable deterrent effect of multiple, independent security devices and the desirable deterrent effect of structurally diverse mechanical and electrical security devices while advantageously decreasing the inconvenience to a vehicle owner with respect to using two security devices simultaneously and decreasing the time and effort required on the part of a vehicle owner with respect to using the devices simultaneously.

BRIEF DESCRIPTION OF THE DRAWING

The foregoing objects, and others, will in part be obvious and in part pointed out more fully hereinafter in conjunction with the written description of preferred embodiments of the invention illustrated in the accompanying drawings in which.

DESCRIPTION OF PREFERRED EMBODIMENTS

Figure 1:
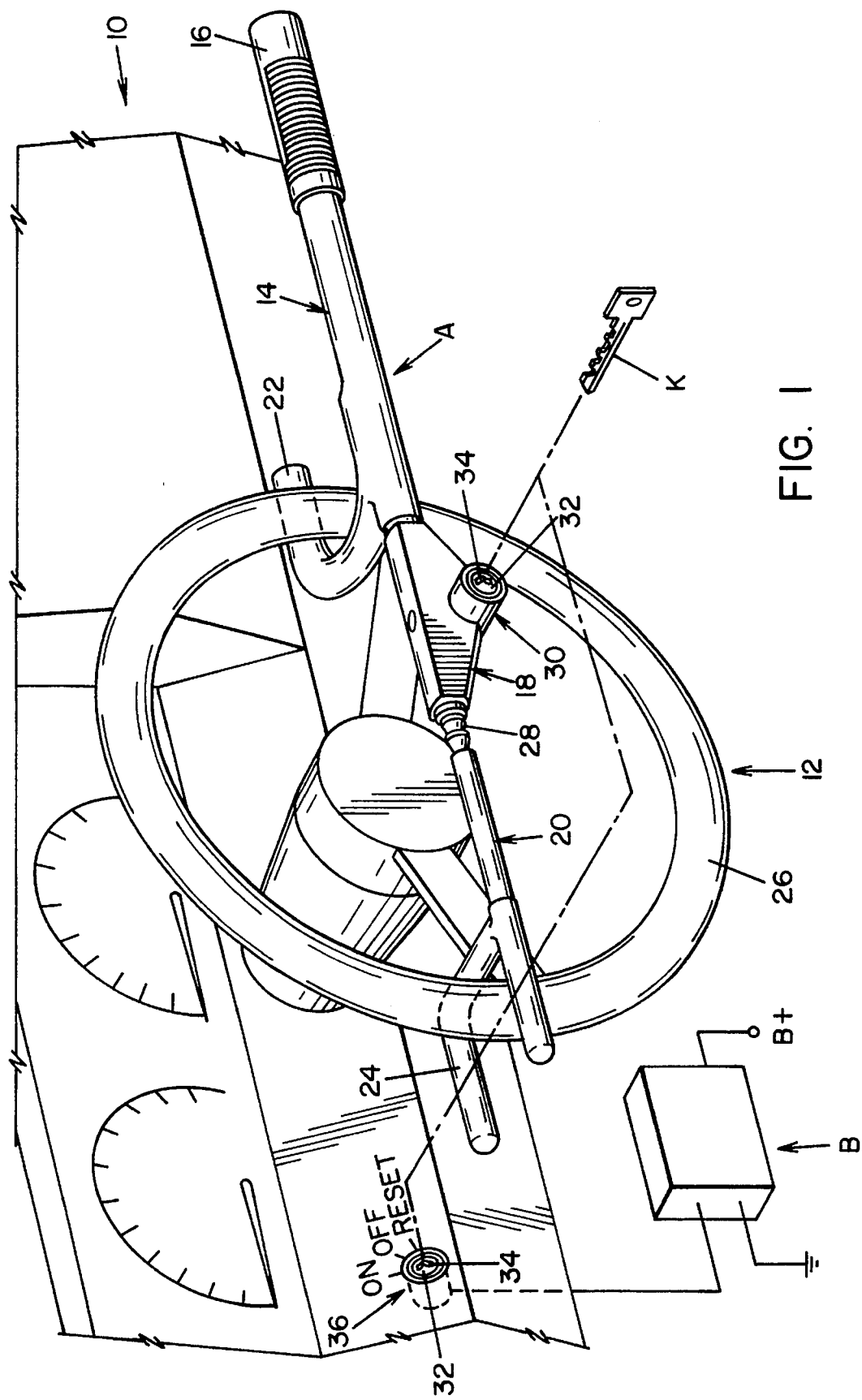
FIG. 1 is a perspective view of the interior of a vehicle showing key operated mechanical and electrical security devices in accordance with the present invention.

Referring now in greater detail to the drawing wherein the showings are for the purpose of illustrating preferred embodiments of the invention only and not for the purpose of limiting the same, FIG. 1 somewhat schematically illustrates the dashboard 10 and steering wheel assembly 12 in the driving compartment of an automobile or other vehicle, and illustrates a mechanical anti-theft security device A mounted on the vehicle steering wheel. FIG. 1 also schematically illustrates an electrically operable security device B which will be described in greater detail hereinafter.

In the embodiment illustrated, mechanical security device A is an anti-theft steering wheel lock of the type illustrated in the aforementioned patent to Johnson, whereby a detailed description of the structure and operation thereof will not be necessary. Briefly, and as disclosed in the Johnson patent, anti-theft device A includes an elongated tubular body portion 14 having an outer end provided with a hand grip 16 and an inner end attached to lock housing 18. An elongated steel rod 20 is axially slideably received in lock housing 18 and body portion 14 and has an inner end in the body portion. Attachment components in the form of hooks 22 and 24 are provided respectively on body portion 14 and rod 20 and are adapted to engage diametrically opposed portions of vehicle steering wheel rim 26 from the inside thereof when the device is installed on the steering wheel as shown in FIG. 1 to provide its anti-theft function. Rod 20 is provided with annular grooves 28 along the length thereof which cooperate with a ball detent mechanism, not shown, in lock housing 18 to axially hold rod 20 in an adjusted position thereof relative to body portion 14 thereof.

Lock housing 18 supports a key operated locking mechanism 30 including a tumbler 32 having a key slot 34 which receives a key K which is operable to displace an internal locking member, not shown, by which rod 20 is selectively locked in place relative to body portion 14 and lock housing 18 or released for axial sliding displacement relative thereto. When security device A is installed or mounted, as shown in FIG. 1, rod 20 is extended relative to body portion 14 and lock housing 18 for hooks 22 and 24 to engage against the inner side of the diametrically opposed portions of steering wheel rim 26, and key K is used to operate lock mechanism 30 to secure rod 20 in place relative to lock housing 18. In the mounted position of security device A, body portion 14 extends radially outwardly from the vehicle rim, whereby an effort to rotate the steering wheel results in the body portion engaging the interior of the vehicle or a person sitting in the drivers position so as to preclude sufficient rotation of the steering wheel for driving the vehicle. To dismount security device A, an authorized person unlocks rod 20 through the use of key K so that the rod and hook 24 are displaceable toward the lock housing to facilitate removing the device from the steering wheel.

In accordance with one embodiment of the present invention, electrically operable security device B is located in the vehicle and is operable between armed and disarmed modes by means of a key operated switch mechanism 36 which, preferably, is mounted on dashboard 10 of the vehicle. Further in accordance with the present invention, key operated switch mechanism 36 includes a tumbler 32 having a key slot 34 and which tumbler and key slot are identical to tumbler 32 and key slot 34 of key operated locking mechanism 30 of security device A. Accordingly, both security devices A and B are operable through use of the same common key K.

Figure 2:
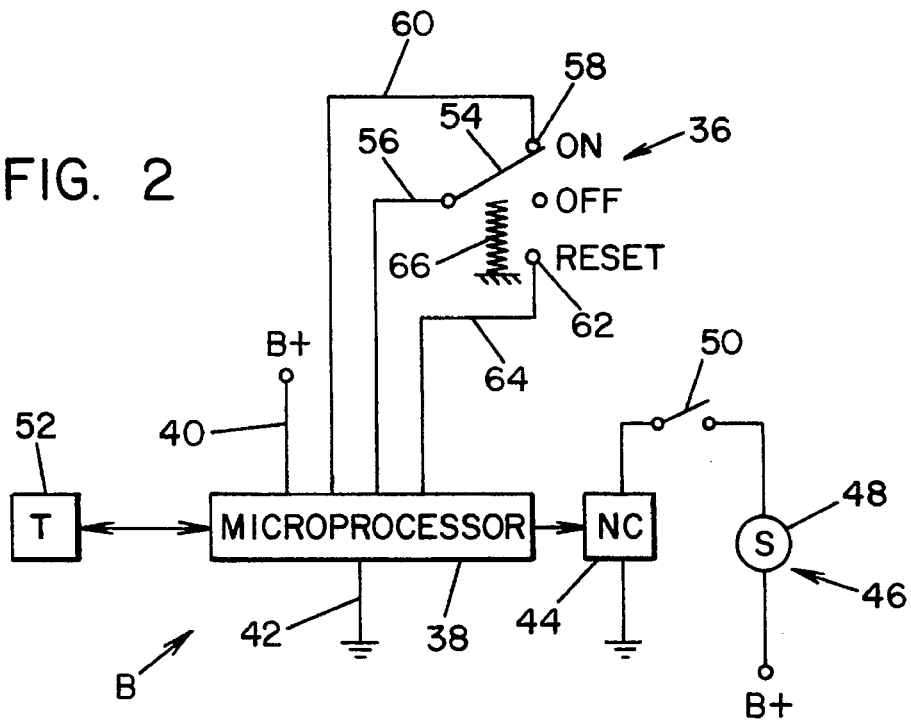
FIG. 2 is a block diagram of the circuitry for the electrical security device.

While it will be appreciated that electrically operable security device B may provide any one or a combination of a variety of security functions including, for example, audible alarms or sirens, visual signals, blinking of the vehicle headlights, intermittent honking of the vehicle horn and the like, security device B in the preferred embodiment is operable, when armed, to open or otherwise inhibit the starting motor circuit of the vehicle so as to preclude starting of the vehicle motor such as by crossing wires leading to the ignition switch of the vehicle. More particularly in this respect, as schematically illustrated in FIG. 2 of the drawing, security device B includes a microprocessor 38 which is connected across the vehicle or other battery by lines 40 and 42 and which is operable as described more fully hereinafter to control a normally closed switch 44 provided in starting motor circuit 46 which includes starting motor 48 connected across the vehicle battery through ignition switch 50. While a microprocessor is referred to in connection with this embodiment, it will be appreciated that the control functions provided thereby can also be provided by microchips or other control circuits.

Figure 3:
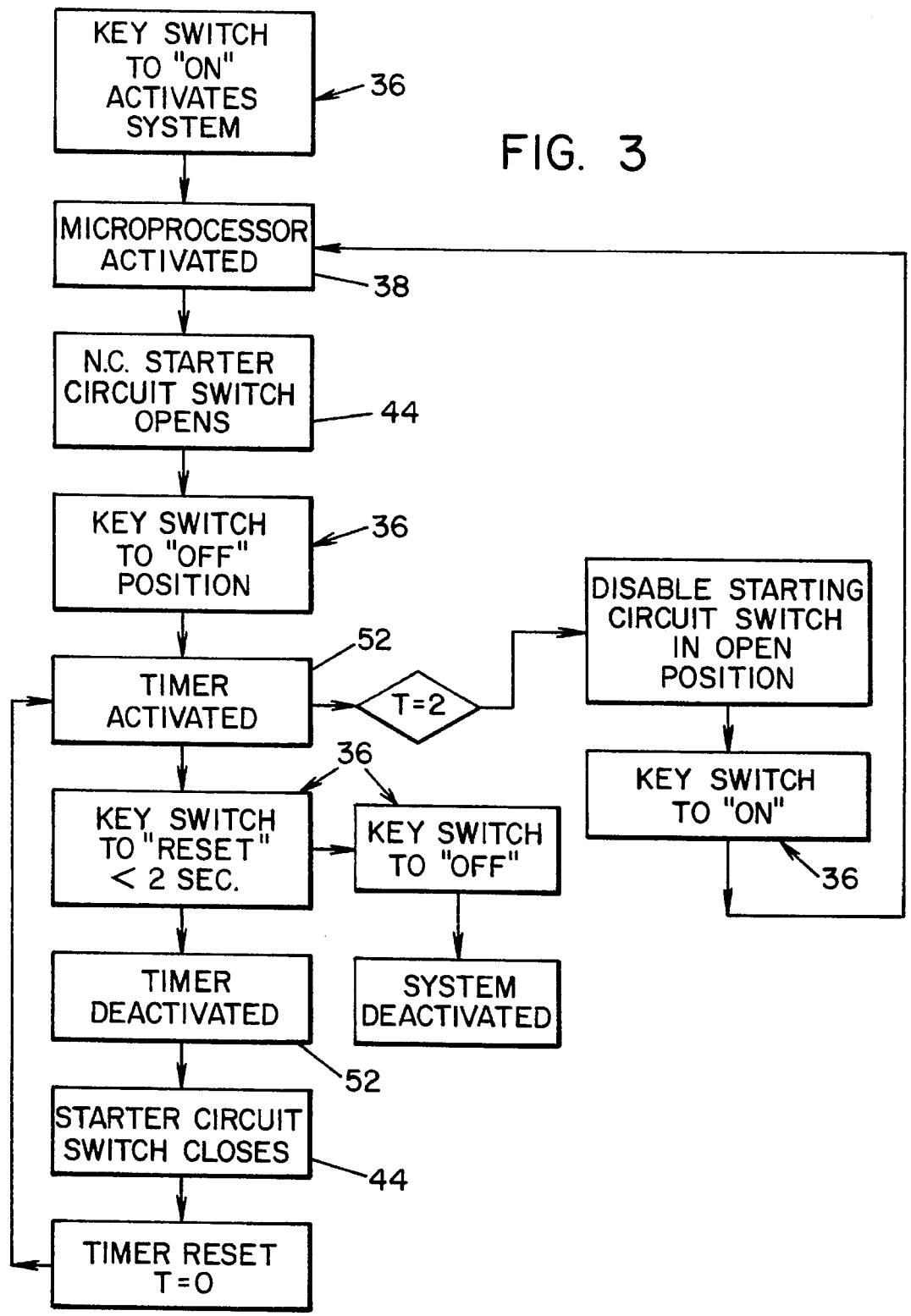
FIG. 3 is a flow diagram for the electrical security device.

Security device B further includes a timer 52 and, as described above, is adapted to be armed and disarmed through key operated switch mechanism 36. Switch mechanism 36 includes a switch arm 54 which is displaceable between ON, OFF and RESET positions as shown in FIG. 2 in response to rotation of tumbler 32 of switch mechanism 36 between the corresponding positions shown in FIG. 1 through the use of key K. Switch arm 54 is connected to microprocessor 38 through line 56, and in the ON position engages contact 58 which is connected to the microprocessor through line 60. In the OFF position the switch is open to the microprocessor, and in the RESET position switch arm 54 engages contact 62 which is connected to microprocessor 38 through line 64. When switch arm 54 is displaced from the OFF to the RESET position, such displacement is against the bias of a return spring 66, whereby it will be appreciated that, upon release of key K in the RESET position switch arm 54 is returned to the OFF position. It will be appreciated that timer 52 and normally closed starter circuit switch 44 are conventional known types of devices the functions of which are implemented and controlled by microprocessor 38. Moreover, the operation of microprocessor 38 is regulated by a control program that is stored in its memory and accessed in accordance With the positions of key operated switch mechanism 36. The functions of the timer and normally closed starter circuit switch as controlled by the microprocessor program in conjunction with he various positions of key operated switch mechanism 36 are illustrated in flow diagram form in FIG. 3 of the drawing.

Security device B is disarmed when switch mechanism 36 is in the OFF position and is adapted to be armed by displacing the switch mechanism from the OFF to the ON position as shown in FIGS. 1 and 2. As will be appreciated from FIGS. 2 and 3 microprocessor 38 is programmed to open normally closed switch 44 in response to displacement of switch arm 54 to the ON position, whereby arming of security device B precludes starting of the vehicle either by closure of ignition switch 50 or cutting and connecting the wires at the ignition switch. When the security device is disarmed by moving switch arm 54 from the ON to the OFF position, timer 52 is activated and microprocessor 38 is operable to maintain normally closed switch 44 open for a period of time determine by timer 52 such as two seconds, for example. If switch 36 remains in the OFF position for this period of time, timer 52 outputs this information to microprocessor 38 and, in response thereto, the microprocessor is programmed to disable normally closed switch 44 in the open position whereby the vehicle still can not be started through closure of ignition switch 50 or creating a short thereacross. If, on the other hand, key operated switch 36 is displaced to the OFF position to disarm the security device-and is then displaced to the RESET position in less than two seconds, switch arm 54 closes a circuit to microprocessor 38 through lines 56 and 64 which operates to deactivate timer 52. Microprocessor 38 is programmed to respond to such deactivation of the timer by closing normally closed switch 44 in starting circuit 46, whereby the vehicle can be started by closing ignition switch 50. Timer 52 is then reset to 0, spring 66 return switch arm 54 to the off position, and security device B remains disarmed.

In the event that an authorized user of the vehicle turns key operated switch 36 from the ON to the OFF position to disarm security device B and forgets or fails to displace switch arm 54 sufficiently toward the RESET position to engage contact 62, it will be appreciated from the foregoing description that normally closed switch 44 is disabled in the open position thereof so as to preclude starting the vehicle through ignition switch 50. In this situation, it is only necessary for the authorized user to turn key operated switch 36 back to the ON position to activate microprocessor 38 whereby the security device is again in the armed mode, and then displace key operated switch 36 to the OFF position to disarm the device and to the RESET position within two seconds in order to deactivate timer 52, whereupon microprocessor 38 is operable to close normally closed switch 44. Thus, security device B is disarmed and the vehicle can be started through ignition switch 50.

As will be appreciated from the foregoing description, if switch wires 56, 60 and 64 are cut by a would-be thief, the cutting of either or both wires 56 and 60 opens the circuit therebetween and provides a condition corresponding to the displacement of switch arm 54 to the OFF position. Accordingly, timer 52 is activated and, after a period of two seconds, microprocessor 38 operates to lock normally closed switch 44 in the open position thereof to preclude starting of the vehicle through ignition switch 50. In order for the thief to cross the cut wires in a manner to achieve reclosing of switch 44, the thief would have to first connect wires 56 and 60 to activate the microprocessor to place the security device in the armed mode and then disconnect wires 56 and 60 and connect wires 56 and 64 to effect disarming of the security device and deactivating of timer 52 so that the processor would activate switch 44 to its normally closed condition. It will be appreciated that it would be virtually impossible for a person to preform the specific wire connecting and disconnecting functions in this respect.

As an alternative to the switching arrangement and control described above, a wire bundle from lock switch mechanism 36 to the microprocessor could be employed to provide an encoded signal to the microprocessor through key operation of the switch and which code can not be replicated by cutting and rejoining the wires. Thus when the system is armed, an effort to defeat the security device in this manner activates the control by which the security function is maintained, whereby operation of the vehicle is inhibited. It will be appreciated that this anti-defeat arrangement does not require a timer in the control circuit.

Figure 4:
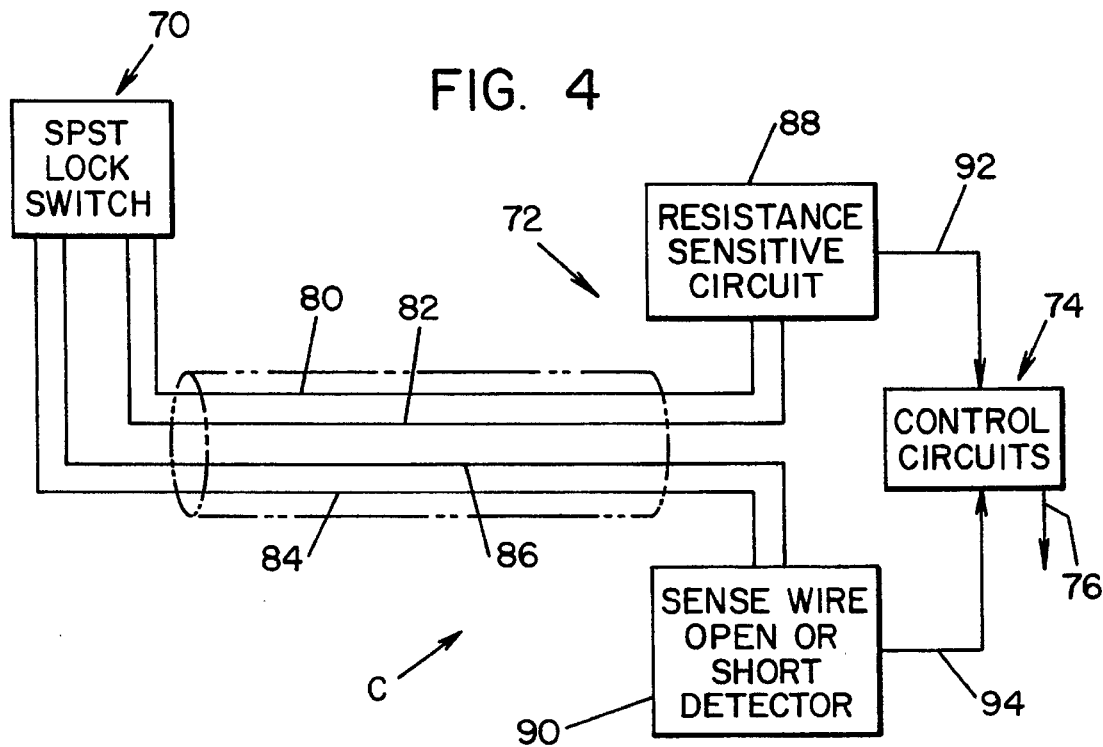
FIG. 4 is a block diagram of the circuitry for another embodiment of the electrical security device.

Referring now to FIG. 4, there is illustrated another embodiment of the electrical security device in accordance with the invention. In this embodiment, the security device C is armed and disarmed by a key operated switch mechanism 70 and includes an electronic circuit 72 which is operable to control a security function or functions through a control circuit or circuits designated generally by the numeral 74. One security function can, for example, be the opening of the vehicle staring motor circuit by means of a normally closed switch in the later circuit as described in the previous embodiment. In any event, it will be appreciated that the control circuit or circuits output a control signal or signals through line 76 to the device or devices providing the security function or functions.

In this embodiment, key operated switch mechanism 70 is a single pole, single throw switch having ON and OFF positions but is otherwise similar to switch mechanism 36 and, in this respect, it is operable in conjunction with a key operated mechanical security device, such as device A in the previous embodiment, through a single common key. Further in connection with this embodiment, switch mechanism 70 is connected to circuit 72 through a first set of wires 80 and 82 and through a second set of wires 84 and 86. Wires 80 and 82 are connected to a resistance sensitive circuit 88 in circuit 72, and wires 84 and 86 are connected to a short detecting circuit 90 in circuit 72. Resistance sensitive circuit 88 has an output to the control circuit or circuits 74 through line 92, and short detecting circuit 90 has an output to control circuit or circuits 74 through line 94. Wires 80 and 82 are of resistive wire of a given length. Accordingly, if theses wires are cut and spliced by a would-be thief, the resistance changes.

Security device C is in the armed mode when key operated switch mechanism 70 is in the ON position. When the security device is so armed, circuit 72 is activated and circuits 88 and 90 thereof output signals to control circuit 74 which in turn outputs a signal through line 76 to open the normally closed switch in the starting motor circuit to disable the latter. When key operated lock mechanism 70 is displaced from the ON to the OFF position the security device is disarmed, circuit 72 is deactivated and control circuit 74 functions to close the normally closed switch in starting motor circuit, whereby the vehicle can be started through the ignition switch in the starting motor circuit. If, when the security device is armed, a would-be thief cuts wires 80 and 82 and splices the wires in an effort to bypass key operated switch mechanism 70, the change in resistance is sensed by resistance sensing circuit 88 which then outputs a signal through line 92 to control circuit 74 which is operable to maintain the security device armed and thus, in this embodiment, maintain the normally closed switch in the starting motor circuit open to preclude starting of the vehicle through the ignition switch or by an effort to bypass the latter. If the would be thief cuts wires 84 and 86 either alone or together with wires 80 and 82, the cutting of either of the wires 84 and 86 is sensed by short detecting circuit 90 which outputs a signal through line 94 to control circuit 74 which also maintains the security device armed. While the security device in this embodiment is shown to have two pairs of wires each operable through circuit 72 to maintain the security device armed in response to an effort to bypass key operated switch mechanism 70, it will be appreciated that either pair of wires alone can provide for maintaining the desired security function in response to such a bypass effort. Moreover, it will be appreciated that the resistance sensitive circuit 88 and the short detecting circuit 90 together with control circuit 74 could, in addition to maintaining the staring motor circuit open, operates to provide a visual or audible alarm in response to the attempted bypass.

While considerable emphasis has been placed on the embodiments herein illustrated and described, it will be appreciated that other embodiments of the invention can be made and that many modifications can be made with respect to the preferred embodiments without departing from the principles of the invention. In this respect, for example, it will be appreciated that the time controlling disabling of the starting circuit switch in the open position or to deactivate the timer to avoid such disabling can be other than the two seconds set forth herein. Likewise, it will be appreciated that a key operated electrical security device as described herein can be used independent of a mechanical security device to obtain the advantage of maintaining a security function or operation in response to an effort to defeat the device such as by cutting the wires to the key operated switch. These and other embodiments and modifications of the preferred embodiment will be obvious to those skilled in the art, whereby it is to be distinctly understood that the foregoing descriptive matter is to be interpreted merely as illustrative of the present invention and not as a limitation.

What is claimed is:

1. A vehicle anti-theft system comprising first security means mountable in a vehicle to limit rotation of the vehicle steering wheel and comprising first and second attachment means relatively displaceable between mounted and dismounted positions, first key operated lock means including a first key operated tumbler for locking and unlocking said first and second attachment means in said mounted position, second security means in said vehicle comprising electrically operated security circuit means having armed and disarmed modes, second key operated lock means separate from said first key operated lock means, said second key operated lock means including switch means having closed and opened conditions respectively corresponding to said armed and disarmed modes and a second key operated tumbler for displacing said switch means between said closed and opened conditions, said first and second tumblers being identical, and a common key member for operating both said first and second tumblers.

2. An anti-theft system according to claim 1, wherein said first and second attachment means of said first security means engage diametrically opposed portions of said steering wheel in said mounted position, and said first security means includes arm means extending radially outwardly of said steering wheel.

3. An anti-theft system according to claim 1, wherein said second key operated lock means is mounted on the dashboard of said vehicle.

4. An anti-theft system according to claim 1, wherein said security circuit means includes means providing a security function when said switch means is in said closed condition and means for maintaining said security function when said switch means changes from closed to open condition for a predetermined time.

5. An anti-theft system according to claim 4, wherein said closed condition of said switch means is a first closed condition and said switch means includes a second closed condition, and said circuit means includes means for deactivating said security-function when said switch means is changed from said first to said second closed condition prior to expiration of said predetermined time.

6. An anti-theft system according to claim 1, wherein said vehicle includes a starting motor circuit and said security circuit means includes means to inhibit said starting motor circuit when said switch means is in said closed condition.

7. An anti-theft system according to claim 6, wherein the switch means of said second key operated lock means is first switch means and said means to inhibit said starting motor circuit includes normally closed switch means in said starting motor circuit and means in said security circuit means for opening said normally closed switch means when said first switch means is in said closed condition.

8. An anti-theft system according to claim 7, wherein said security circuit means includes means to maintain said normally closed switch means open when said first switch means changes from closed to open condition.

9. An anti-theft system according to claim 8, wherein said means to maintain said normally closed switch means open includes timing means, and said security circuit means includes means responsive to said timing means for disabling said normally closed switch means in said open position when said first switch means changes from closed to open condition for a predetermined time.

10. An anti-theft system according to claim 7, wherein said closed and open conditions are respectively first and second positions of said first switch means and said security circuit means includes means to maintain said normally closed switch means open in response to displacement of said first switch means from said first to said second position.

11. An anti-theft system according to claim 10, wherein said means to maintain said normally closed switch means open includes timing means, and said security circuit means includes means responsive to said timing means for disabling said normally closed switch means in said open position when said first switch means is displaced from said first to said second position and remains in said second position for a predetermined period of time.

12. An anti-theft system according to claim 11, wherein said first switch means has a third position, and said security circuit means includes means for closing said normally closed switch means after said predetermined period of time in response to displacement of said first switch means from said second position sequentially to said first and third positions.

13. An anti-theft system according to claim 9, wherein, said first switch means has a reset condition, and said security circuit means includes means for closing said normally closed switch means after said predetermined period of time in response to displacement of said first switch means from said open condition sequentially to said closed and reset conditions.

14. An anti-theft system according to claim 1, wherein said switch means of said second key operated lock means is first switch means and said security circuit means includes security function switch means having an operative mode for providing a security function when said first switch means is in said closed condition and having an inoperative mode, and means to maintain said security function switch means in said operative mode when said first switch means changes from closed to open condition.

15. An anti-theft system according to claim 14, wherein said means to maintain said security function switch means in said operative mode includes timing means, and said security circuit means includes means responsive to said timing means for maintaining said security function switch means in said operative mode when said first switch means changes from closed to open condition for a predetermined time.

16. An anti-theft system according to claim 15, wherein said first switch means has a reset condition and said security circuit means includes means for shifting said security function switch means to said inoperative mode in response to displacement of said first switch means from said closed condition to said reset condition prior to expiration of said predetermined period of time.

17. An anti-theft system according to claim 16, wherein said security circuit means includes means for shifting said security function switch means after said predetermined time in response to displacement of said first switch means from said open condition sequentially to said closed and reset conditions.

18. An anti-theft system according to claim 17, wherein said first and second attachment means of said first security means engage diametrically opposed portions of said steering wheels in said mounted position, and said first security means includes arm means extending radially outwardly of said steering wheel.

19. An anti-theft system for a vehicle having an ignition switch comprising, electrically operated security circuit means having armed and disarmed modes, control switch means separate from said ignition switch having closed and open conditions respectively providing said armed and disarmed modes, said circuit means including means connected to said control switch means for providing a security function when said circuit means is in said armed mode, and means for maintaining said security function when said control switch means changes from closed to open condition.

20. An anti-theft system according to claim 19, wherein said closed condition of said control switch means is a first closed condition and said control switch means includes a second closed condition, and said circuit means includes timing means and means responsive to said timing means for deactivating said security function when said control switch means is changed from said first to said second closed condition prior to expiration of a predetermined time.

21. An anti-theft system according to claim 19, wherein said vehicle includes a starting motor circuit and said security circuit means includes means separate from said ignition switch to open said starting motor circuit when said control switch means is in said closed condition.

22. An anti-theft system according to claim 21, wherein said means to open said starting motor circuit includes normally closed switch means in said starting motor circuit, and means in said security circuit means for opening said normally closed switch means when said control switch means is in said closed condition.

23. An anti-theft system according to claim 22, wherein said security circuit means includes means to maintain said normally closed switch means open when said control switch means changes from closed to open condition.

24. An anti-theft system according to claim 23, wherein said means to maintain said normally closed switch means open includes timing means, and said security circuit means includes means responsive to said timing means disabling said normally closed switch means in said open position when said control switch means changes from closed to open condition for a predetermined time.

25. An anti-theft system according to claim 22, wherein said closed and open conditions are respectively first and second positions of said control switch means and said security circuit means includes means to maintain said normally closed switch means open in response to displacement of said control switch means from said first to said second position.

26. An anti-theft system according to claim 25, wherein said means to maintain said normally closed switch means open includes timing means, and said security circuit means includes means responsive to said timing means disabling said normally closed switch means in said open position when said control switch means is displaced from said first to said second position and remains in said second position for a predetermined period of time.

27. An anti-theft system according to claim 26, wherein said control switch means has a third position, and said security circuit means includes means for closing said normally closed switch means in response to displacement of said control switch means from said second position to said third position prior to expiration of said predetermined period of time.

28. An anti-theft system according to claim 26, wherein said control switch means has a third position and said security circuit means includes means for closing said normally closed switch means after said predetermined period of time in response to displacement of said control switch means from said second position sequentially to said first and third positions.

29. An anti-theft system according to claim 23, wherein said means to maintain said normally closed switch means open includes resistance means in said security circuit means connected to said control switch means and having a predetermined resistance, and means for sensing a change in said predetermined resistance, when said control switch means is closed.

30. An anti-theft system according to claim 23, wherein said means to maintain said normally closed switch means open includes conductor means connecting said control switch means to said security circuit means, and means in said security circuit means for sensing an open circuit through said conductor means when said control switch means is closed.

31. An anti-theft system for a vehicle having an ignition switch comprising electrically operated security circuit means shiftable between armed and disarmed modes, key operated switch means separate from said ignition switch for shifting said circuit means between said armed and disarmed modes, wire means connecting said key operated switch means to said circuit means, said circuit means including means connected to said key operated switch means for providing a security function when said circuit means is in said armed mode, and means for maintaining said security function in response to cutting said wire means.

32. In a vehicle anti-theft system comprising first security means mountable in a vehicle to limit rotation of the vehicle steering wheel and comprising first and second attachment means relatively displaceable between mounted and dismounted positions and first lock means including first key operated tumbler means for locking and unlocking said first and second attachment means in said mounted position, the improvement comprising: electrically operated second security means in said vehicle having armed and disarmed modes, and second lock means including second key operated tumbler means for shifting said second security means between said armed and disarmed modes, said first and second tumbler means being identical, and a single common key member for operating both said first and second key operated tumbler means.

* * * * *